Patented Feb. 13, 1934

1,947,330

UNITED STATES PATENT OFFICE 1,947,330

PROCESS OF PRODUCING PREPARATIONS OF OPIUM

Paul Casparis, Basel, and Kurt Siegfried, Zofingen, Switzerland

No Drawing. Application September 12, 1931, Serial No. 562,600, and in Switzerland October 28, 1930

3 Claims. (Cl. 167—67)

The present invention relates to a process of producing preparations of opium which are almost completely free of ballast matter and contain the various alkaloids of opium.

Preparations such as those known under the trade-names of Pantopon, Pavon and others and which contain all the alkaloids of the opium in a form that is soluble in water are obtainable in the trade. Some of them are supposed to be obtained directly from opium, others are coloured mixtures of the alkaloids.

We have now found that preparations which contain all the alkaloids of opium and which are distinguished by their colour, the stableness of the solutions, sure action and painless application, may be obtained by separating from the opium solution at first morphine and narcotine and by extracting the other alkaloids by means of chloroform from the mother liquor, purifying the mixed hydrochloric acid solutions of the alkaloids, removing the purifying agent and drying the product.

Phenol or a paste of ferric hydroxide may be used as purifying agent for the alkaloid hydrochloride solutions.

Example 1

10 grams extractum opii are prepared as follows: 100 parts raw opium powder are macerated for 12 hours with 500 parts of cold, freshly distilled water and thereupon separated by suction. The solution is heated to 65° for one-half hour and then placed in contact with ice. The residue is then macerated with a mixture of 7 parts of dilute phosphoric acid and 250 parts water, for a period of six hours. The solution is separated by suction filtration and heated and contacted with ice as with the above solution.

The maceration residue is to be macerated twice more for three hours with 150 parts water. The solutions obtained are treated as above. The solutions are then added together and placed on ice for twenty-four hours and filtered. The filtrate is reduced to 250 parts by heating to between 30° and 40° under reduced pressure. This solution is again placed on ice for twenty-four hours, filtered and reduced to dryness by heating under reduced pressure to a temperature of between 30° and 40°. This extractum opii is dissolved in a mixture of 10 grams alcohol and 10 grams water; 5 grams ammonia are added to the solution. The solution is left to stand for 48 hours and is then filtered off with a strong suction action with a few cubic centimetres of 40% alcohol and washed with much water. The filter residue contains almost the total content of morphine and narcotine in a sufficiently pure form, the filtrate contains the other alkaloids.

The filter residue is diluted with 30 cm³ alcohol in a spacious flask; during a continued heating on the water bath 0.1 n-hydrochloric acid is added until all the residue has gone in solution and the solution is weakly acid to litmus and neutral to Congo (consumption of 0.1 n-HCl approximately 86 cm³).

The filtrate containing the alkaloids with the exception of morphine and narcotine is shaken with chloroform in a separating funnel as long as alkaloids pass into the chloroform (test with Mayer's reagent). The combined chloroform solutions are poured through a dry filter, the latter is washed with chloroform and the solution is freed of the chloroform by distillation on the water-bath. The brown residue is dissolved in a few cubic-centimetres of alcohol and 0.1 n-hydrochloric acid is added until it is weakly acid to litmus. Thereupon 50 cm³ water are added whereby a strong milky turbidity is caused. 0.1 n-hydrochloric acid is further added until the solution is nearly clear and is weakly acid to litmus and neutral to Congo. (Consumption of 0.1 n-HCl approximately 32 cm³).

The two hydrochloric acid solutions of alkaloids are mixed, filtered if necessary, and evaporated in vacuum to approximately 7 times the amount of the extract used. Thereupon 3.5 grams colourless Phenolum liquefactum are added, the mixture is well shaken and placed on ice for 24 hours. Then the mixture is filtered and residue and filter are thoroughly washed with colourless 5% phenol-water. The solution is then shaken in a separating funnel with ether until in a sample of ether no phenol can be ascertained (by the smell or by reaction with bromine-water). The aqueous solution is thereupon evaporated in vacuum to a syrup and placed while hot in a bowl into a desiccator and left therein to completely dry under a reduced pressure.

Example 2

Morphine and narcotine are separated as in Example 1 and the still damp bases brought into approximately 50 cm³ water to which 1.5-2 cm³ 10% HCl is added whereupon they readily dissolve.

The filtrate containing the other alkaloids is mixed with such a quantity of freshly precipitated ferric hydroxide that a viscous liquid is obtained. The latter is frequently and strongly shaken and left to stand for several hours during which time the shaking is occasionally repeated. Then it is filtered off in the suction-apparatus; the matter obtained is placed in a bowl and digested with 80 to 100 cm³ water on the water-bath under stirring (for approximately ¼ of an hour), then again filtered in the suction apparatus and these treatments repeated as long as Mayer's reagent causes a considerable turbidity in the filtrate. The solutions are brought together with the hydrochloric acid solution of morphine-narcotine and are further treated as has been mentioned above in Example 1.

The products obtained have a very light colour, they dissolve readily to a clear solution in water; the solutions remain clear and stable for a long time, they may be sterilized and injected without causing the least pain.

The yield according to the method 1 is approximately 40% of the extract treated and approximately 20% of opium; and according to method 2 approximately 50% of the extract and approximately 25% of opium. Preparation 1 contains 48–50% of morphine and 17–18% of other alkaloids, preparation 2 contains 33–34% of morphine and 17–18% of other alkaloids.

We claim:

1. A method of producing a preparation of opium which is almost completely free of ballast matter and contains a quantity of each of the alkaloids of opium, which comprises first separating morphine and narcotine from an opium solution by means of ammonia, and extracting the other alkaloids by means of chloroform from the mother-liquor.

2. A method of producing a preparation of opium which is almost completely free of ballast matter and contains each of the alkaloids of opium, which comprises first separating morphine and narcotine from an opium solution by means of ammonia, extracting the other alkaloids by means of chloroform from the mother-liquor, dissolving the separated and extracted alkaloids by addition of hydrochloric acid, purifying the united hydrochloric acid alkaloid solutions, removing the purifying agent, and drying the product.

3. A method of producing a preparation of opium which is almost completely free of ballast matter and contains each of the alkaloids of opium, which comprises first separating morphine and narcotine from an opium solution by means of ammonia, extracting the other alkaloids by means of chloroform from the mother-liquor, dissolving the separated and extracted alkaloids by addition of hydrochloric acid, purifying the united hydrochloric acid alkaloid solutions by the aid of phenol, removing the purifying agent, and drying the product.

PAUL CASPARIS.
KURT SIEGFRIED.